United States Patent
Harders et al.

(10) Patent No.: US 8,772,381 B2
(45) Date of Patent: Jul. 8, 2014

(54) USE OF WAXES IN A CROSS-LINKED BITUMEN/POLYMER COMPOSITION FOR IMPROVING ITS RESISTANCE TO CHEMICAL ATTACK AND CROSS-LINKED BITUMEN/ POLYMER COMPOSITION COMPRISING SAID WAXES

(75) Inventors: Sylvia Harders, Buchholz (DE); Julien Chaminand, Vaulx en Velin (FR)

(73) Assignee: Total Raffinage Marketing, Puteaux (FR)

( * ) Notice: Subject to any disclaimer, the term of this patent is extended or adjusted under 35 U.S.C. 154(b) by 144 days.

(21) Appl. No.: 13/504,876

(22) PCT Filed: Oct. 29, 2010

(86) PCT No.: PCT/IB2010/054914
§ 371 (c)(1),
(2), (4) Date: Apr. 27, 2012

(87) PCT Pub. No.: WO2011/051912
PCT Pub. Date: May 5, 2011

(65) Prior Publication Data
US 2012/0220700 A1    Aug. 30, 2012

(30) Foreign Application Priority Data
Oct. 29, 2009  (FR) ...................................... 09 57628

(51) Int. Cl.
*C08L 95/00* (2006.01)

(52) U.S. Cl.
USPC ............................................... 524/62; 524/71

(58) Field of Classification Search
USPC ......................................................... 524/62
See application file for complete search history.

(56) References Cited

U.S. PATENT DOCUMENTS

| 6,588,974 | B2 |   | 7/2003 | Hildebrand et al. |       |
|-----------|----|---|--------|-------------------|-------|
| 8,003,717 | B2 | * | 8/2011 | Bobee et al.      | 524/59|
| 8,048,943 | B2 | * | 11/2011| Gonzalez Leon et al.| 524/60|
| 2004/0102547 | A1 | * | 5/2004 | Cowley et al.   | 524/59|
| 2011/0098385 | A1 | * | 4/2011 | Botel et al.    | 524/71|
| 2011/0144242 | A1 |   | 6/2011 | Chaverot et al. |       |
| 2011/0319533 | A1 | * | 12/2011| Gauthier et al. | 524/71|
| 2012/0060722 | A1 |   | 3/2012 | Montpeyroux et al. |    |

FOREIGN PATENT DOCUMENTS

| EP | 1845134 | 10/2007 |
| WO | WO 2008/101809 | 8/2008 |
| WO | WO 2008101809 A1 * | 8/2008 |

* cited by examiner

*Primary Examiner* — Hui Chin
(74) *Attorney, Agent, or Firm* — Harness, Dickey & Pierce, P.L.C.

(57) ABSTRACT

The present disclosure relates to the use of 2 to 6% by mass of Fischer-Tropsch waxes in a cross-linked bitumen/polymer composition for improving the cross-linked bitumen/polymer composition's resistance to aggressive chemical agents.

11 Claims, No Drawings

USE OF WAXES IN A CROSS-LINKED BITUMEN/POLYMER COMPOSITION FOR IMPROVING ITS RESISTANCE TO CHEMICAL ATTACK AND CROSS-LINKED BITUMEN/ POLYMER COMPOSITION COMPRISING SAID WAXES

CROSS-REFERENCE TO RELATED APPLICATIONS

This application is a National Phase Entry of International Application No. PCT/IB2010/054914, filed on Oct. 29, 2010, which claims priority to French Patent Application Serial No. 0957628, filed on Oct. 29, 2009, both of which are incorporated by reference herein.

TECHNICAL FIELD

The present invention relates to the use of waxes in bituminous compositions for improving their resistance to chemical attack. The invention also relates to the cross-linked bitumen/polymer compositions comprising said waxes. The invention also relates to the method for preparing said cross-linked bitumen/polymer compositions. The invention finally relates to the mixes comprising said cross-linked bitumen/polymer compositions and aggregates and their preparation method.

BACKGROUND

It is known to use cross-linked bitumen/polymer compositions, as coatings of various surfaces and, in particular, as road coatings, provided that these compositions exhibit in combination a certain number of mechanical characteristics. In order to maintain and/or improve the characteristics and in particular the mechanical properties of a conventional bitumen, cross-linked bituminous compositions have for a long time been used, in which the bitumen (formed from one or more types of bitumens) is mixed with one or more functional polymers, in particular styrene and butadiene elastomers, these elastomers being chemically cross-linked in situ, optionally using a coupling or cross-linking agent, for example sulphur or at least one of its precursors.

Optimized mechanical characteristics are in particular crucial for road coating applications. In addition to the mechanical properties, in the case of bitumens account should be taken of their susceptibility to certain chemical agents. These aggressive chemical agents can be, for example, hydrocarbon solvents, in particular petroleum-based solvents such as kerosenes, gas oils and/or gasolines or also products, in particular fluids, used for de-icing and/or defrosting and/or snow removal from aircraft and from taxiing zones. These fluids are for example aqueous saline solutions of potassium, sodium, magnesium and/or calcium, and/or compositions based on ethylene glycol and/or based on propylene glycol.

The aggressive effect of such chemical agents builds up with the stresses of intense traffic, in particular of heavy vehicles, and bad weather, which has the detrimental effect of increasing the rapid degradation of carriageways, in particular aircraft runways. This susceptibility of the bitumens to these aggressive chemical agents, to chemical attack is more particularly problematic for the bitumens constituting for example tarmacs and the coatings of airport runways, which are made of bituminous mixes (bitumen/aggregates conglomerate). In fact, these airport tarmacs and coatings are frequently soiled by drips of kerosene, during the filling of aircraft tanks, by leaks or other accidental spills of petroleum products. Moreover, they are also exposed to the different fluids used in cold weather to remove ice, frost and/or snow from aircraft and runways.

Service stations as well as industrial tank farms can also be subject to this same problem of the bituminous coatings' resistance to aggressive chemical agents such as hydrocarbon solvents and/or de-icing/defrosting/snow removal fluids. Conventional road carriageways are of course also exposed to this type of chemical attack.

In an attempt to remedy this, it has been proposed to incorporate various additives in bitumens. Thus the patent EP1311619 describes the use of waxes in bitumens for increasing their resistance to hydrocarbons. The waxes are in particular synthetic waxes originating from the Fischer Tropsch synthesis process. Said bitumens can optionally contain polymers which are not cross-linked.

SUMMARY

The Applicant company discovered, surprisingly, that the use of Fischer-Tropsch waxes in a cross-linked bitumen/polymer composition made it possible to obtain very greatly improved resistance to chemical attack, in particular greatly improved resistance with respect to hydrocarbons, in particular with respect to petroleum hydrocarbons such as gasolines, kerosenes and/or gas oils. The improvement was also observed for products used for de-icing and/or defrosting and/or snow removal, such as salt solutions and/or compositions based on ethylene glycol and/or based on propylene glycol. The combination of Fischer-Tropsch waxes and the cross-linked polymer gives, very surprisingly, an improvement in resistance of the cross-linked bitumen/polymer composition to the aforementioned chemicals, and in particular with respect to petroleum hydrocarbons such as gasolines, kerosenes and/or gas oils. The effect of the Fischer-Tropsch waxes combined with the cross-linked polymer is greater than the sum of the effects obtained for Fischer-Tropsch waxes in a pure bitumen and for a cross-linked bitumen/polymer composition not including Fischer-Tropsch waxes. The Applicant company discovered, surprisingly, a very strong synergistic effect between the Fischer-Tropsch waxes and the cross-linked polymer in the improvement of resistance to the aforementioned chemicals, and in particular with respect to petroleum hydrocarbons such as gasolines, kerosenes and/or gas oils.

BRIEF DESCRIPTION

The invention relates to the use of 2% to 6% by mass of Fischer-Tropsch waxes, with respect to the mass of the cross-linked bitumen/polymer composition, in a cross-linked bitumen/polymer composition comprising a cross-linked copolymer of an aromatic monovinyl hydrocarbon and a conjugated diene, for improving the resistance of said cross-linked bitumen/polymer composition to aggressive chemicals. Preferably, the cross-linked copolymer of an aromatic monovinyl hydrocarbon and a conjugated diene is a cross-linked styrene/butadiene copolymer. Preferably, the copolymer of an aromatic monovinyl hydrocarbon and a conjugated diene has a content of 1,2 double bond units derived from the conjugated diene, between 5% by mass and 50% by mass, with respect to the total mass of the conjugated diene units, preferably between 10% and 40%, more preferentially between 15% and 30%, even more preferentially between 18% and 25%, and even more preferentially between 18% and 23% or between 20% and 25%.

Preferably, the copolymer of an aromatic monovinyl hydrocarbon and a conjugated diene is combined with a cross-linking agent. Preferably, the cross-linking agent comprises flowers of sulphur. Preferably, the cross-linking agent is selected from the compounds of general formula HS—R—SH, where R represents a saturated or unsaturated, linear or branched hydrocarbon group with 2 to 40 carbon atoms, optionally comprising one or more heteroatoms, such as oxygen.

Preferably, the cross-linked bitumen/polymer composition comprises from 1 to 10% by mass copolymer of an aromatic monovinyl hydrocarbon and of a conjugated diene, with respect to the mass of the cross-linked bitumen/polymer composition, preferably 2 to 8%, more preferably 3 to 6%, even more preferably 4 to 5%. Preferably, the cross-linked bitumen/polymer composition comprises from 0.05 to 5% by mass cross-linking agent, with respect to the mass of the cross-linked bitumen/polymer composition, preferably between 0.1% and 2%, more preferentially between 0.2% and 1%, even more preferentially between 0.3% and 0.5%. Preferably, the quantity of Fischer-Tropsch waxes in the cross-linked bitumen/polymer composition is comprised between 3 and 6% by mass, with respect to the mass of the cross-linked bitumen/polymer composition, preferably between 3% and 5%, more preferentially between 3% and 4%. Preferably, the aggressive chemical agents are due to hydrocarbons, preferably petroleum hydrocarbons such as kerosenes, gasolines and/or gas oils.

Preferably, the aggressive chemical agents are due to products used for de-icing, defrosting and/or snow removal, preferably salt solutions and/or compositions based on ethylene glycol and/or based on propylene glycol. Preferably, the resistance of the cross-linked bitumen/polymer composition to aggressive chemicals is improved when it is used as a surface layer in a roadway application. Preferably, the resistance of the cross-linked bitumen/polymer composition to aggressive chemicals is improved when it is mixed with aggregates in a bituminous mix.

The invention also relates to a cross-linked bitumen/polymer composition, preferably without any cross-linking agent, comprising at least one bitumen, at least 2% to 6% by mass of Fischer-Tropsch waxes, with respect to the mass of the cross-linked bitumen/polymer composition and at least one copolymer of an aromatic monovinyl hydrocarbon and a conjugated diene that has a content of 1,2 double bond units derived from the conjugated diene, comprised between 5 and 50% by mass, with respect to the total mass of the conjugated diene units, preferably between 10% and 40%, more preferentially between 15% and 30%, even more preferentially between 18% and 25%, and even more preferentially between 18% and 23% or between 20% and 25%. Preferably, this cross-linked bitumen/polymer composition is free of oil of petroleum origin, of vegetal or animal origin. In fact, the presence of oil may degrade the resistance to aggressive chemicals, especially to hydrocarbons, of the cross-linked bitumen/polymer composition by softening too much the cross-linked bitumen/polymer composition.

The invention also relates to a cross-linked bitumen/polymer composition comprising at least one bitumen, at least 2% to 6% by mass of Fischer-Tropsch waxes, with respect to the mass of the cross-linked bitumen/polymer composition, at least one copolymer of an aromatic monovinyl hydrocarbon and a conjugated diene and at least one cross-linking agent selected from the compounds of general formula HS—R—SH, where R represents a saturated or unsaturated, linear or branched hydrocarbon group with 2 to 40 carbon atoms, optionally comprising one or more heteroatoms, such as oxygen. Preferably, the copolymer of an aromatic monovinyl hydrocarbon and a conjugated diene is a styrene/butadiene copolymer. Preferably, the cross-linked bitumen/polymer composition comprises between 2 and 8% by mass of aromatic monovinyl hydrocarbon and conjugated diene copolymer with respect to the mass of the cross-linked bitumen/polymer composition, preferably between 3% and 7%, and more preferentially between 4% and 5%. Preferably, the cross-linked bitumen/polymer composition comprises between 3 and 6% by mass of Fischer-Tropsch waxes, with respect to the mass of the cross-linked bitumen/polymer composition, preferably between 3% and 5%, more preferentially between 3% and 4%.

The invention also relates to the method for preparing a cross-linked bitumen/polymer composition as defined above, in which the following are brought into contact at between 120° C. and 220° C., preferably between 140° C. and 200° C., more preferentially between 160° C. and 180° C., for a period of 1 hour to 48 hours, preferably 4 hours to 24 hours, more preferentially 8 hours to 16 hours: at least one bitumen, at least one aromatic monovinyl hydrocarbon and conjugated diene copolymer, which has a content of 1,2 double bond units originating from the conjugated diene, between 5 and 50% by mass, with respect to the total mass of the conjugated diene units, preferably between 10% and 40%, more preferentially between 15% and 30%, even more preferentially between 18% and 25%, and even more preferentially between 18% and 23% or between 20% and 25%, and optionally at least one cross-linking agent, then said mixture is brought into contact, at between 120° C. and 220° C., preferably between 140° C. and 200° C., more preferentially between 160° C. and 180° C., for a period of 30 minutes to 48 hours, preferably 1 hour to 24 hours, more preferentially 4 hours to 16 hours, with 2% to 6% by mass of Fischer-Tropsch waxes.

The invention also relates to the method for preparing a cross-linked bitumen/polymer composition as defined above, in which the following are brought into contact at between 120° C. and 220° C., preferably between 140° C. and 200° C., more preferentially between 160° C. and 180° C., for a period of 1 hour to 48 hours, preferably 4 hours to 24 hours, more preferentially 8 hours to 16 hours: at least one bitumen, at least one aromatic monovinyl hydrocarbon and conjugated diene copolymer, and at least one cross-linking agent selected from the compounds of general formula HS—R—SH, where R represents a saturated or unsaturated, linear or branched hydrocarbon group with 2 to 40 carbon atoms, optionally comprising one or more heteroatoms, such as oxygen, then said mixture is brought into contact, at between 120° C. and 220° C., preferably between 140° C. and 200° C., more preferentially between 160° C. and 180° C., for a period of 30 minutes to 48 hours, preferably 1 hour to 24 hours, more preferentially 4 hours to 16 hours, with 2% to 6% by mass of Fischer-Tropsch waxes.

The invention also relates to a bituminous mix comprising a cross-linked bitumen/polymer composition as defined above in a mixture with aggregates. The invention also relates to the method for preparing a bituminous mix as defined above in which the aggregates and the cross-linked bitumen/polymer composition as defined above are mixed between 120° C. and 220° C., preferably between 140° C. and 200° C., more preferentially between 160° C. and 180° C.

DETAILED DESCRIPTION

The waxes (or paraffins) used are synthetic waxes obtained from the Fischer-Tropsch synthesis process. These Fischer-Tropsch waxes are generally prepared by reacting carbon monoxide with hydrogen, typically at elevated pressures on a metallic catalyst. The Fischer-Tropsch waxes that are preferred are the Fischer-Tropsch waxes described in application WO9911737. The Fischer-Tropsch waxes described in this document are Fischer-Tropsch waxes comprising a mixture of paraffins. The Fischer-Tropsch waxes comprise a majority of n-paraffins, often more than 90%, the remainder being constituted by iso-paraffins.

The average length of the paraffinic chains of the Fischer-Tropsch waxes is between 30 and 115 carbon atoms, preferably between 40 and 100, more preferentially between 60 and 90. The Fischer-Tropsch waxes have a melting point (freezing point) comprised between 65 and 105° C., preferably between 68 and 100° C. The Fischer-Tropsch waxes used in the invention can be partially oxidized or fully oxidized.

A preferred example of Fischer-Tropsch wax is that sold under the brand name Sasobit®, which has a freezing point of 100° C. (ASTM D 938), a penetrability at 25° C. less than 1 1/10 mm (ASTM D 1321) and a penetrability at 65° C. of 7 1/10 mm (ASTM 1321). Other types of Fischer-Tropsch waxes that can be used are the Fischer-Tropsch waxes described in patent EP1951818. These Fischer-Tropsch waxes contain a somewhat larger quantity of isomerized paraffins than the standard Fischer-Tropsch waxes. These Fischer-Tropsch waxes comprising more iso-paraffins are characterized by a freezing point (ISO 2207) comprised between 85 and 120° C. and a PEN value at 43° C., expressed in 0.1 mm, determined according to IP 376, greater than 5.

The quantity of Fischer-Tropsch waxes added to the cross-linked bitumen/polymer compositions is essential to the invention. Thus, the quantity of Fischer-Tropsch waxes is comprised between 2 and 6% by mass, with respect to the mass of the cross-linked bitumen/polymer composition, preferably between 2.5% and 5.5%, more preferentially between 3% and 5%, even more preferentially between 3% and 4%. The Applicant company noticed that a quantity less than 2% by mass of Fischer-Tropsch waxes in the cross-linked bitumen/polymer composition did not provide a significant improvement of resistance to chemical attack, in particular resistance to petroleum hydrocarbons such as gasolines, kerosenes and/or gas oils of the cross-linked bitumen/polymer composition. Furthermore, a quantity greater than 6% by mass of Fischer-Tropsch waxes in the cross-linked bitumen/polymer composition causes a fragility in the cross-linked bitumen/polymer compositions, which become brittle. This results in a deterioration in the elastic recovery, traction and low temperature behaviour properties, for example with respect to the Fraass point. The Applicant company noticed that there is a strong synergistic effect between the Fischer-Tropsch waxes in the quantities mentioned above and the cross-linked polymer, which can give a very significant increase in resistance to chemical attack, in particular resistance to petroleum hydrocarbons such as gasolines, kerosenes and/or gas oils, of the cross-linked bitumen/polymer compositions.

The cross-linked bitumen/polymer composition comprises bitumen as its principal constituent. The bitumen used can be a bitumen obtained from different origins. The bitumen which can be used according to the invention can be chosen from the bitumens of natural origin, such as those contained in deposits of natural bitumen, natural asphalt or bituminous sands. The bitumen which can be used according to the invention can also be a bitumen or a mixture of bitumens originating from the refining of crude oil such as bitumens from direct distillation or bitumens from distillation under reduced pressure or also blown or semi-blown bitumens, residues from deasphalting with propane or pentane, visbreaking residues, these different cuts being able to be alone or in a mixture. The bitumens used can also be bitumens fluxed by adding volatile solvents, fluxes of petroleum origin, carbochemical fluxes and/or fluxes of vegetable origin. It is also possible to use synthetic bitumens also called clear, pigmentable or colourable bitumens. The bitumen can be a bitumen of naphthenic or paraffinic origin, or a mixture of these two bitumens.

The cross-linked bitumen/polymer composition also comprises at least one cross-linkable polymer. This polymer is selected from copolymers based on conjugated diene units and aromatic monovinyl hydrocarbon units, as these copolymers can be cross-linked. The conjugated diene is preferably chosen from those comprising 4 to 8 carbon atoms, such as 1,3 butadiene (butadiene), 2-methyl-1,3-butadiene (isoprene), 2,3-dimethyl-1,3-butadiene, 1,3-pentadiene, 1,2-hexadiene, chloroprene, carboxylated butadiene and/or carboxylated isoprene. Preferably, the conjugated diene is butadiene. The aromatic monovinyl hydrocarbon is preferably chosen from styrene, o-methyl styrene, p-methyl styrene, p-tert-butylstyrene, 2,3 dimethyl-styrene, α-methyl styrene, vinyl naphthalene, vinyl toluene and/or vinyl xylene. Preferably, the monovinyl hydrocarbon is styrene.

More particularly, the polymer of the cross-linked bitumen/polymer composition consists of one or more copolymers chosen from the aromatic monovinyl hydrocarbon and conjugated diene, in particular styrene and butadiene, copolymers, linear or star-shaped, in diblock, triblock and/or multi-branched form, optionally with or without a random hinge, preferably with a random hinge. Preferably, the copolymer is an aromatic monovinyl hydrocarbon and conjugated diene diblock copolymer, in particular a styrene and butadiene diblock copolymer, in particular a styrene and butadiene diblock copolymer having a random hinge. The aromatic monovinyl hydrocarbon and conjugated diene, in particular styrene and butadiene, copolymer has an average molecular mass $M_W$ comprised between 10,000 and 500,000 daltons, preferably between 50,000 and 200,000, more preferentially between 80,000 and 150,000, even more preferentially between 100,000 and 130,000, even more preferentially between 110,000 and 120,000. The molecular mass of the copolymer is measured by GC chromatography with a polystyrene standard according to the standard ASTM D3536.

The aromatic monovinyl hydrocarbon and conjugated diene, in particular styrene and butadiene, copolymer advantageously has a content by weight of aromatic monovinyl hydrocarbon, in particular of styrene ranging from 5% to 50% by mass, with respect to the mass of copolymer, preferably from 20% to 40%. The aromatic monovinyl hydrocarbon and conjugated diene, in particular styrene and butadiene, copolymer advantageously has a content by weight of conjugated diene, in particular butadiene, ranging from 50% to 95% by mass, with respect to the mass of copolymer, preferably from 60% to 80%.

Among these conjugated diene units, a distinction is drawn between the 1,4 double bond units originating from the conjugated diene and the 1,2 double bond units originating from the conjugated diene. By 1,4 double bond units originating from the conjugated diene, is meant the units obtained via a 1,4 addition during the polymerization of the conjugated diene. By 1,2 double bond units originating from the conjugated diene, is meant the units obtained via a 1,2 addition during the polymerization of the conjugated diene. The result of this 1,2 addition is a so-called "pendant" vinyl double bond.

The aromatic monovinyl hydrocarbon and conjugated diene, in particular styrene and butadiene, copolymer has a content of 1,2 double bond units originating from the conjugated diene, in particular originating from the butadiene, comprised between 5% and 50% by mass, with respect to the total mass of the conjugated diene, in particular butadiene, units, preferably between 10% and 40%, more preferentially between 15% and 30%, even more preferably between 18% et 25%, even more preferentially between 18% and 23% or between 20% and 25%, more preferably between 20% and 23%, even more preferably between 21% and 22%. The aromatic monovinyl hydrocarbon and conjugated diene, in particular styrene and butadiene, copolymer having a content of 1,2 double bond units originating from the conjugated diene, in particular originating from the butadiene as defined above can be used with or without cross-linking agent, as it has the property of being "self cross-linking", the copolymer branches are cross-linked, linked to each other via these so-called "pendant" vinyl double bonds. The cross-linked bitumen/polymer composition according to the invention preferably comprises 1% to 10% by mass of polymer, in particular aromatic monovinyl hydrocarbon and conjugated diene, in particular styrene and butadiene, copolymer, with respect to the mass of the bituminous composition, preferably 2% to 8%, even more preferentially 3% to 5%.

In addition to this aromatic monovinyl hydrocarbon and conjugated diene, in particular styrene and butadiene, copolymer, the cross-linked bitumen/polymer composition can optionally comprise another type of polymer selected from polybutadienes, polyisoprenes, butyl rubbers, polyacrylates, polymethacrylates, polychloroprenes, polynorbornenes, polybutenes, polyisobutenes, polyethylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene (EPDM) terpolymers, acrylonitrile/butadiene/styrene (ABS) terpolymers, ethylene/acrylate or alkyl methacrylate/glycidyl acrylate or methacrylate terpolymers and in particular ethylene/methyl acrylate/glycidyl methacrylate terpolymer and ethylene/alkyl acrylate or methacrylate/maleic anhydride terpolymers and in particular ethylene/butyl acrylate/maleic anhydride terpolymer.

The cross-linking of the aromatic monovinyl hydrocarbon and conjugated diene, in particular styrene and butadiene, copolymer in the cross-linked bitumen/polymer composition, is achieved thanks to the use of an aromatic monovinyl hydrocarbon and conjugated diene, in particular styrene and butadiene, copolymer as defined above and a cross-linking agent, or thanks to the use of an aromatic monovinyl hydrocarbon and conjugated diene, in particular styrene and butadiene, copolymer having a particular quantity of 1,2 double bond units originating from the conjugated diene, in particular butadiene, this quantity of 1,2 double bond units originating from the conjugated diene, in particular butadiene, being comprised between 5% and 50% by mass, with respect to the total mass of the conjugated diene, in particular butadiene, units preferably between 10% and 40%, more preferentially between 15% and 30%, even more preferentially between 18% and 25%, even more preferentially between 18% and 23% or between 20% and 25%, or also thanks to the use of said aromatic monovinyl hydrocarbon and conjugated diene, in particular styrene and butadiene, copolymer, having the particular quantity defined above of 1,2 double bond units originating from the conjugated diene, in particular from the butadiene, in combination with a cross-linking agent.

Preferably, the cross-linking agent is chosen from sulphur and the hydrocarbyl polysulphides, alone or in a mixture, optionally in the presence of sulphur-donor or non-sulphur-donor vulcanization accelerators, alone or in a mixture. The sulphur is in particular flowers of sulphur or also alpha crystallized sulphur. The hydrocarbyl polysulphides are for example chosen from the dihexyl disulphides, dioctyl disulphides, didodecyl disulphides, ditertiododecyl disulphides, dihexadecyl disulphides, dihexyl trisulphides, dioctyl trisulphides, dinonyl trisulphides, ditertiododecyl trisulphides, dihexadecyl trisulphides, diphenyl trisulphides, dibenzyl trisulphides, dihexyl tetrasulphides, dioctyl tetrasulphides, dinonyl tetrasulphides, ditertiododecyl tetrasulphides, dihexadecyl tetrasulphides, diphenyl tetrasulphides, orthotolyl tetrasulphides, dibenzyl tetrasulphides, dihexyl pentasuiphides, dioctyl pentasulphides, dinonyl pentasulphides, ditertiododecyl pentasulphides, dihexadecyl pentasuiphides, dibenzyl pentasulphides or diallyl pentasulphides.

The sulphur-donor vulcanization accelerators can be chosen from the thiuram polysulphides, such as for example, the tetrabutylthiuram disulphides, tetraethylthiuram disulphides and tetramethylthiuram disulphides, dipentamethylenethiuram disulphides, dipentamethylenethiuram tetrasulphides or dipentamethylenethiuram hexasulphides.

The non-sulphur-donor vulcanization accelerators which can be used according to the invention can be chosen in particular from mercaptobenzothiazole and its derivatives, dithiocarbamates and derivatives, and thiuram monosulphides and derivatives, alone or in a mixture. There may be mentioned as examples of non-sulphur-donor vulcanization accelerators, zinc 2-mercaptobenzothiazole, zinc benzothiazole thiolate, sodium benzothiazole thiolate, benzothiazyl disulphide, copper benzothiazole thiolate, benzothiazyl N,N'-diethyl thiocarbamyl sulphide and benzothiazole suiphenamides such as 2-benzothiazole diethyl sulphenamide, 2-benzothiazole pentamethylene sulphenamide, 2-benzothiazole cyclohexyl sulphenamide, N-oxydiethylene 2-benzothiazole sulphenamide, N-oxydiethylene 2-benzothiazole thiosulphenamide, 2-benzothiazole dicyclohexyl sulphenamide, 2-benzothiazole diisopropyl sulphenamide, 2-benzothiazole tertiobutyl sulphenamide, bismuth dimethyl dithiocarbamate, cadmium diamyl dithiocarbamate, cadmium diethyl dithiocarbamate, copper dimethyl dithiocarbamate, lead diamyl dithiocarbamate, lead dimethyl dithiocarbamate, lead pentamethylene dithiocarbamate, selenium dimethyl dithiocarbamate, tellurium diethyl dithiocarbamate, zinc diamyl dithiocarbamate, zinc dibenzyl dithiocarbamate, zinc diethyl dithiocarbamate, zinc dimethyl dithiocarbamate, zinc dibutyl dithiocarbamate, zinc pentamethylene dithiocarbamate, dipentamethylene thiuram monosulphide, tetrabutyl thiuram monosulphide, tetraethyl thiuram monosulphide and tetramethyl thiuram monosulphide.

The cross-linking agent can also be chosen from the compounds of general formula HS—R—SH where R represents a saturated or unsaturated, linear or branched hydrocarbon group with 2 to 40 carbon atoms, optionally comprising one or more heteroatoms, such as oxygen. Among the compounds corresponding to this general formula, there can be mentioned for example 1,2 ethanedithiol, 1,3 propanedithiol, 1,4 butanedithiol, 1,5 pentanedithiol, 1,6 hexanedithiol, 1,7 heptanedithiol, 1,8 octanedithiol, bis-(2-mercaptoethyl)ether, bis-(3-mercaptoethyl)ether, bis-(4-mercaptoethyl)ether, (2-mercaptoethyl) (3-mercaptobutyl)ether, (2-mercaptoethyl) (4-mercaptobutyl)ether, 1,8-dimercapto-3,6-dioxaoctane, benzene-1,2-dithiol, benzene-1,3-dithiol, benzene-1,4-dithiol or toluene-3,4-dithiol, biphenyl-4,4'-dithiol.

In general a quantity of cross-linking agent between 0.05% and 5% by mass, with respect to the mass of the bituminous composition, preferably between 0.1% and 2%, more preferentially between 0.2% and 1%, even more preferentially between 0.3% and 0.5% is used. Preferably, the quantities of polymer and cross-linking agent are fixed so as to obtain a polymer/cross-linking agent (styrene and butadiene copolymer/cross-linking agent) ratio comprised between 50:1 and 150:1, preferably between 60:1 and 100:1, more preferentially between 70:1 and 80:1.

The cross-linking of the cross-linked bitumen/polymer compositions can be demonstrated by carrying out on these cross-linked bitumen/polymer compositions tensile tests according to the standard NF EN 13587. The cross-linked bitumen/polymer compositions have a higher tensile strength than the non-cross-linked bitumen/polymer compositions A higher tensile strength results in a high ultimate elongation or maximum elongation ($\epsilon$ max in %), a high rupture stress or maximum elongation stress ($\sigma \epsilon$ max in MPa), high conventional energy at 400% (E 400% in J/cm$^2$) and/or high total energy (total E in J). The cross-linked bitumen/polymer compositions have a maximum elongation, according to the standard NF EN 13587, greater than or equal to 400%, preferably greater than or equal to 500%, more preferentially greater than or equal to 600%, even more preferentially greater than or equal to 700%.

The cross-linked bitumen/polymer compositions have a maximum elongation stress, according to the standard NF EN 13587, greater than or equal to 0.4 MPa, preferably greater than or equal to 0.6 MPa, more preferentially greater than or equal to 0.8 MPa, even more preferentially greater than or equal to 1.2 MPa. The cross-linked bitumen/polymer compositions have a conventional energy at 400%, according to the standard NF EN 13587, greater than or equal to 3 J/cm$^2$, preferably greater than or equal to 5 J/cm$^2$, more preferentially greater than or equal to 10 J/cm$^2$, even more preferentially greater than or equal to 15 J/cm$^2$. The cross-linked bitumen/polymer compositions have a total energy, according to the standard NF EN 13587, greater than or equal to 1 J, preferably greater than or equal to 2 J, more preferentially greater than or equal to 4 J, even more preferentially greater than or equal to 5 J.

The cross-linked bitumen/polymer composition can also optionally comprise adhesiveness additives and/or surfactants. They are chosen from the alkyl amine derivatives, alkyl polyamine derivatives, alkyl amidopolyamine derivatives, alkyl amidopolyamine derivatives and quaternary ammonium salt derivatives, alone or in a mixture. The most used are the tallow propylene-diamines, tallow amido-amines, quaternary ammoniums obtained by quaternization of tallow propylene-diamines, tallow propylene-polyamines. The quantity of adhesiveness additives and/or surfactants in the cross-linked bitumen/polymer composition is comprised between 0.1% and 2% by mass, with respect to the mass of the cross-linked bitumen/polymer composition, preferably between 0.2% and 1%.

Firstly, the cross-linked bitumen/polymer composition is prepared without Fischer-Tropsch waxes, by mixing the bitumen, the aromatic monovinyl hydrocarbon and conjugated diene, in particular styrene and butadiene, copolymer and optionally the cross-linking agent at a temperature of 120° C. to 220° C., preferably 140° C. to 200° C., more preferentially 160° C. to 180° C., for a duration of 1 hour to 48 hours, preferably 4 hours to 24 hours, more preferentially 8 hours to 16 hours. When the bitumen/polymer composition is cross-linked, the Fischer-Tropsch waxes are then added to the cross-linked bitumen/polymer composition at a temperature of 120° C. to 220° C., preferably 140° C. to 200° C., more preferentially 160° C. to 180° C., for a duration of 30 minutes to 48 hours, preferably 1 hour to 24 hours, more preferentially 2 hours to 16 hours, even more preferentially 4 hours to 8 hours.

The cross-linked bitumen/polymer compositions comprising Fischer-Tropsch waxes are essentially intended for producing bituminous mixes or surface dressings for road applications. In the case of bituminous mixes, the cross-linked bitumen/polymer compositions comprising Fischer-Tropsch waxes are mixed with aggregates in order to provide bituminous mixes which are resistant to chemical attack, such as those due to hydrocarbons. The quantity of cross-linked bitumen/polymer composition comprising Fischer-Tropsch waxes in the bituminous mixes is comprised between 1 and 10% by mass, with respect to the mass of bituminous mix, preferably between 2 and 8%, more preferentially between 3 and 5%, the remainder being constituted by the aggregates.

The bituminous mixes are used as a surface layer in zones where the surface can come into contact with aggressive chemical agents such as hydrocarbons, for example as a result of runoffs. Such surfaces include for example car parks, airport tarmacs and runways, service stations, roundabouts, tank farms.

The Fischer-Tropsch waxes are used for improving the cross-linked bitumen/polymer compositions' resistance to chemical attack caused by hydrocarbons, in particular petroleum hydrocarbons such as gasolines, fuels, premium fuels, kerosenes, jet fuels, gas oils, diesels. A very marked improvement in resistance to chemical attack was observed with respect to petroleum hydrocarbons such as gasolines, kerosenes and/or gas oils. An improvement was also observed for products used for de-icing, defrosting and/or snow removal products such as the aqueous saline solutions of potassium, sodium, magnesium and/or calcium, and/or compositions based on ethylene glycol and/or based on propylene glycol.

EXAMPLES

The cross-linked bitumen/polymer compositions' resistance to hydrocarbons is evaluated according to an internal method similar to the method used for measuring the Ring and Ball temperature of bitumens (EN 1427). The rings filled with cross-linked bitumen/polymer compositions are placed in the supports conventionally used in the EN 1427 method, 5 g balls are placed on these supports. The supports are placed in a beaker filled with kerosene, instead of the water conventionally used in the standard EN 1427 method. The cross-linked bitumen/polymer compositions' resistance to kerosene is evaluated at ambient temperature and under stirring. The duration, softening time of the two bituminous disks is evaluated until each ball, covered with cross-linked bitumen/polymer compositions, moves downwards by (25.0±0.4) mm. The problem arises of the dissolution of the cross-linked bitumen/polymer compositions in kerosene. The liquid in the beaker then becomes opaque, and it is impossible to know visually when the balls drop. We carried out an inspection by taking the supports out at regular time intervals.

Different cross-linked bitumen/polymer compositions are prepared from:
 bitumen of penetrability equal to 41 $^1/_{10}$ mm and with a Ring and Ball temperature equal to 51.8° C.,
 styrene and butadiene diblock copolymer SB1 comprising 25% by mass of styrene, with respect to the mass of the copolymer, and 12% 1,2 double bond units originating from the butadiene, with respect to the mass of butadiene and a molecular mass Mw of 115,000 daltons,
 styrene and butadiene diblock copolymer SB2 comprising 33% by mass of styrene, with respect to the mass of the copolymer, and 18.5% 1,2 double bond units originating from the butadiene, with respect to the mass of butadiene and a molecular mass Mw of 129,000 daltons, flowers of sulphur, Fischer-Tropsch wax (Sasobit®), in the quantities in % indicated in Table I below.

TABLE I

|  | Bituminous compositions | | | | | |
| --- | --- | --- | --- | --- | --- | --- |
|  | $C_1$ | $C_2$ | $C_3$ | $C_4$ | $C_5$ | $C_6$ |
| Bitumen | 100 | 98 | 95.9 | 93.9 | 96.5 | 94.5 |
| SB1 Copolymer | — | — | 4 | 4 | — | — |
| SB2 Copolymer | — | — | — | — | 3.5– | 3.5 |
| Sulphur | — | — | 0.1 | 0.1 | — | — |
| Sasobit ® | — | 2 | — | 2 | — | 2 |

The compositions are prepared as follows: For bituminous composition $C_2$, a bitumen is introduced into a reactor maintained at 185° C. under stirring at 300 rpm. The content of the reactor is maintained at 185° C. under stirring at 300 rpm for 10 minutes. The Fischer-Tropsch wax is then introduced into the reactor. The content of the reactor is maintained at 185° C. under stirring at 300 rpm for 1 hour.

For the cross-linked bitumen/polymer composition $C_3$, the bitumen and the styrene/butadiene SB1 copolymer is introduced into a reactor maintained at 185° C. and under stirring at 300 rpm. The content of the reactor is then maintained at 185° C. under stirring at 300 rpm for 4 hours. Flowers of sulphur are then introduced into the reactor. The content of the reactor is maintained at 185° C. under stirring at 300 rpm for 2 hours, then at 185° C. and under stirring at 150 rpm for 12 hours.

For the cross-linked bitumen/polymer composition $C_4$, the same procedure is followed and the Fischer-Tropsch wax is then introduced into the reactor. The content of the reactor is maintained at 185° C. under stirring at 300 rpm for 1 hour. For the cross-linked bitumen/polymer composition $C_5$, the bitumen and the styrene/butadiene SB2 copolymer is introduced into a reactor maintained at 190° C. and under stirring at 300 rpm. The content of the reactor is then maintained at 190° C. under stirring at 300 rpm for 24 hours. For the cross-linked bitumen/polymer composition $C_6$, the same procedure is followed and the Fischer-Tropsch wax is then introduced into the reactor. The content of the reactor is maintained at 190° C. under stirring at 300 rpm for 1 hour.

Compositions $C_1$ to $C_3$ correspond to control compositions, as well as composition $C_5$. Bituminous composition $C_1$ is a control bituminous composition constituted by bitumen alone. The control bituminous composition $C_2$ is constituted by bitumen and Fischer-Tropsch wax. The control cross-linked bitumen/polymer composition $C_3$ is constituted by bitumen and sulphur cross-linked styrene and butadiene copolymer SB1. The control cross-linked polymer/bitumen composition $C_5$ is comprised of bitumen and styrene and butadiene copolymer SB1 that is thermally cross-linked without sulphur.

Composition $C_4$ corresponds to a cross-linked bitumen/polymer composition according to the invention. It is constituted by bitumen, sulphur cross-linked styrene and butadiene copolymer SB1 and Fischer-Tropsch wax. Composition $C_6$ corresponds to a cross-linked bitumen/polymer composition according to the invention. It is constituted by bitumen, sulphur cross-linked styrene and butadiene copolymer SB2, thermally cross-linked without sulphur and Fischer-Tropsch wax.

For compositions $C_1$ to $C_6$, the following characteristics are determined:

[1] penetrability at 25° C. denoted $P_{25}$ (/1;10 mm) measured according to the standard EN 1426,

[2] Ring and Ball temperature denoted RBT (° C.) measured according to the standard EN 1427,

[3] Pfeiffer index denoted PI defined by the formula below:

$$PI = \frac{1952 - 500 \times \log(P_{25}) - 20 \times RBT}{50 \times \log(P_{25}) - RBT - 120}$$

[4] elastic recovery denoted ER (%) measured at 25° C. according to the standard NF EN 13398,

[5] the time necessary for the ball to move down (25.0±0.4) mm.

The results are given in Table II below:

TABLE II

|  | Bituminous compositions | | | | | |
| --- | --- | --- | --- | --- | --- | --- |
|  | $C_1$ | $C_2$ | $C_3$ | $C_4$ | $C_5$ | $C_6$ |
| $P_{25}$ (1/10 mm) | 41 | 22.8 | 28.4 | 23.0 | 34.0 | 24.0 |
| RBT (° C.) | 51.8 | 69.2 | 74.0 | 80.2 | 60.4 | 78.0 |
| PI | −1.19 | 0.91 | 2.09 | 2.52 | 0.2 | 2.3 |
| ER (%) | — | — | 76 | 69 | — | — |
| Time | 30 min | 1 h 30 | 1 h 30 | 10 h | 1 h 10 | 17 h |

It is noted that the resistance to kerosene of the bituminous composition $C_1$ is very poor, as it only withstands 30 minutes in a bath of kerosene. When 2% of Fischer-Tropsch wax is added to this bituminous composition $C_1$, bituminous composition $C_2$ is obtained, which withstands 1 hour and 30 minutes in a bath of kerosene. When 4% of styrene and butadiene copolymer SB1 and 0.1% of sulphur are added to bituminous composition $C_1$, the cross-linked bitumen/polymer composition $C_3$ is obtained, which also withstands 1 hour and 30 minutes in a bath of kerosene.

The cross-linked bitumen/polymer composition $C_4$, which comprises both a cross-linked styrene and butadiene copolymer SB1 (as in the cross-linked bitumen/polymer composition $C_3$) and a Fischer-Tropsch wax (as in bituminous composition $C_2$), withstands more than 10 hours in a bath of kerosene. This demonstrates that the combined effect of the Fischer-Tropsch waxes and of the cross-linked styrene and butadiene copolymer is greater than the sum of the effects obtained for the Fischer-Tropsch waxes alone or the cross-linked styrene and butadiene copolymer alone. A synergistic effect is therefore observed. Similarly, the cross-linked bitumen/polymer composition $C_5$, which comprises 3.5% by weight of a cross-linked styrene and butadiene copolymer SB2, thermally cross-linked without sulphur withstands 1 hour and 10 minutes in a bath of kerosene, while the cross-linked bitumen/polymer composition $C_6$, which comprises 3.5% by weight of a cross-linked styrene and butadiene copolymer SB2, thermally cross-linked without sulphur and a Fischer-Tropsch wax withstands 17 hours. Hydrocarbon resistance tests are also carried out on bituminous mixes according to the standard EN12697-43.

The bituminous mixes $E_1$, $E_3$ and $E_4$ comprise respectively 5.6% by mass of composition $C_1$, $C_3$ or $C_4$, with respect to the mass of the bituminous mixes, and 94.4% by mass of aggregates (composition of the aggregates: 38% by mass of 6/10 aggregates, with respect to the mass of the aggregates, 5% by mass of 4/6 aggregates, 5% by mass of 2/4 aggregates, 48% by mass of 0/2 sand and 4% by mass of fillers, content of spaces 8.5-9.5%). The mixes are prepared by mixing the compositions and aggregates at 180° C.

The tests are carried out according to the standard EN12697-43 in gas oil and kerosene. The results are given in Table III below:

TABLE III

|  | Bituminous mixes | | |
| --- | --- | --- | --- |
|  | $E_1$ | $E_3$ | $E_4$ |
| Resistance to gas oil 24 h (A/B) | 5/4 | 3/3 | 0/3 |
| Resistance to gas oil I 72 h (A/B) | — | 4/7 | 0/5 |
| Resistance to kerosene 24 h (A/B) | 13/11 | 6/5 | 1/5 |
| Resistance to kerosene 72 h (A/B) | — | 9/10 | 1/10 |

It is noted that the bituminous mix $E_4$ is more resistant to gas oil and to kerosene than the bituminous mixes $E_1$ and $E_3$, all the A and B values of the bituminous mix $E_4$ being less than or equal to those of the bituminous mixes $E_1$ and $E_3$. The addition of 2% by mass of Fischer-Tropsch waxes (1) to a cross-linked bitumen/polymer composition therefore very clearly improved this cross-linked bitumen/polymer composition's resistance to gas oil and kerosene.

The invention claimed is:

1. A method for improving the resistance to aggressive chemical agents of a cross-linked bitumen/polymer composition comprising from 1 to 10% by mass of a crosslinked aromatic monovinyl hydrocarbon and conjugated diene copolymer, with respect to the mass of the cross-linked bitumen/polymer composition, in which said aromatic monovinyl hydrocarbon and conjugated diene, copolymer has a content of 1,2 double bond units originating from the conjugated diene, comprised between 5% and 50% by mass, with respect to the total mass of the conjugated diene units and using 2 to 6% by mass of Fischer-Tropsch waxes, with respect to the mass of the cross-linked bitumen/polymer composition.

2. The method according to claim 1, in which the cross-linked aromatic monovinyl hydrocarbon and conjugated diene copolymer is a cross-linked styrene and butadiene copolymer.

3. The method according to claim 1, in which the content of 1,2 double bond units originating from the conjugated diene, comprised between 10% and 40% by mass, with respect to the total mass of the conjugated diene units.

4. The method according to claim 1, in which the aromatic monovinyl hydrocarbon and conjugated diene copolymer is combined with a cross-linking agent.

5. The method according to claim 4, in which the cross-linking agent comprises flowers of sulphur.

6. The method according to claim 4, in which the cross-linking agent is chosen from the compounds of general formula HS—R—SH, where R represents a saturated or unsaturated, linear or branched hydrocarbon group with 2 to 40 carbon atoms, optionally comprising one or more heteroatoms.

7. The method according to claim 4, in which the cross-linked bitumen/polymer composition comprises from 0.05 to 5% by mass of cross-linking agent, with respect to the mass of the cross-linked bitumen/polymer composition.

8. The method according to claim 1, in which the aggressive chemical agents are hydrocarbons.

9. The method according to claim 1, in which the aggressive chemical agents are products used for de-icing, defrosting and/or snow removal.

10. The method according to claim 1 for improving the cross-linked bitumen/polymer composition's resistance to aggressive chemical agents when it is in a mixture with aggregates in a bituminous mix.

11. The method according to claim 6, in which the one of more heteroatoms comprise oxygen.

* * * * *